United States Patent [19]

Krugler et al.

[11] 4,041,642
[45] Aug. 16, 1977

[54] PROCESS FOR IMPROVING THE YIELD OF SUGAR BEETS USING LOW INTENSITY LIGHT

[75] Inventors: Joel I. Krugler, Sudbury; William F. Nelson, Weston, both of Mass.

[73] Assignee: GTE Laboratories Incorporated, Waltham, Mass.

[21] Appl. No.: 694,264

[22] Filed: June 9, 1976

[51] Int. Cl.² ............................................. A01G 1/00
[52] U.S. Cl. .................................... 47/58; 47/DIG. 6
[58] Field of Search .............................. 47/58, DIG. 6

[56] References Cited

U.S. PATENT DOCUMENTS 3,340,648  9/1967  Frantzen .................................. 47/58

OTHER PUBLICATIONS

Sleepless Sugar, Life, Feb. 6, 1950, p. 79.
The Reaction Controlling . . ., Borthwick et al., Proc. Natl. Acad. Sci., Nov. 1952, pp. 929–934.
Lighting for Plant Growth, Bickford et al., 1972, Kent St. Univ. Press, pp. 87, 89, 126, 133, 210 cited.

Primary Examiner—Robert E. Bagwill
Attorney, Agent, or Firm—Irving M. Kriegsman; Robert A. Seldon

[57] ABSTRACT

A method for increasing the yield of recoverable sugar from sugar beets is disclosed, wherein the beets are illuminated during at least a portion of the night with light having a wavelength in the range of 560nm to 700nm.

5 Claims, No Drawings

PROCESS FOR IMPROVING THE YIELD OF SUGAR BEETS USING LOW INTENSITY LIGHT

FIELD OF THE INVENTION

This invention relates to plant husbandry and to a process for improving crop yield. Specifically, this invention concerns a process wherein artificial light is utilized to improve the yield of sugar beets.

DESCRIPTION OF THE PRIOR ART

Increases in sugar beet yield have heretofore been obtained by selective breeding of the beets and by careful control of soil fertilization.

SUMMARY OF THE INVENTION

In its broadest aspect, this invention is a method for increasing the amount of recoverable sugar yielded by sugar beets by illuminating them during at least a portion of the night with light having a wavelength in the range of 560nm to 700nm.

Although the mechanism by which the sugar content is thus increased can not be explained with total certainty, it is theorized that the phytochrome system of the plant is directly or indirectly utilized.

The phytochrome system is a proteinaceous photoreceptor existing in two forms within plants and controlling a variety of plant processes, such as flowering, stem elongation and seed germination. At least two forms of phytochrome exist and are hereinafter referred to as $P_r$ and $P_{fr}$. $P_r$ is photoconverted to $P_{fr}$ by light having wavelengths of approximately 560nm to 700nm, with peak conversion efficiency occurring at approximately 660nm. $P_{fr}$, the active form, decays to $P_r$ during the night or in response to plant illumination with light of 700nm to 800nm.

It is believed that the phytochrome either regulates the nutrient uptake of the beets, controls the distribution of the biochemical energy derived from the nutrients, or controls the efficiency with which the plant utilizes photoenergy by either controlling the photosynthesis or regulating the transportation and restoration rates to affect the oxygen/carbon dioxide balance. Stimulation of the phytochrome to maintain a constantly high average $P_{fr}$ level causes an increase in sugar production by the beet biosystem.

DESCRIPTION OF THE PREFERRED EMBODIMENT

A light source having a predominant spectral emission in the range of 560nm to 700nm was utilized consisting of a Lumalux lamp and a metal halide arc discharge lamp containing lithium with a peak emission at 670nm. Lumalux is a trademark owned by GTE Sylvania for high pressure sodium lamps. The lamps were filtered by means of amber filters having a low optical cutoff at 560nm.

As will be more fully described in the example below, the beets were illuminated for four hours each night from emergence until harvest. The night-time illumination, hereinafter called night interruption, was centered around solar midnight on the theory that a maximum photoconversion of $P_r$ to $P_{fr}$ occurs if the plants are appropriately illuminated several hours into the night period rather than immediately after sundown. It is theorized that the $P_{fr}$ level in a plant is near saturation by sunset and an intervening dark period between daylight and illumination thereby allows a sufficient decay in the $P_{fr}$ level. On the other hand, it is believed preferable to maintain a high average $P_{fr}$ level during the night and it is, therefore, desirable to illuminate the plants before the $P_{fr}$ level has fallen too low. Accordingly, solar midnight was selected as a convenient reference.

As will be apparent from the following example, the preferred intensity of illumination was found to be less than $0.47\mu W/cm^2$ when four hours of illumination were provided each night. Since an intensity of $0.47\mu W/cm^2$ applied for four hours supplies $70J/m^2$ of optical energy, it may be deduced that the night interruption of sugar beets with 560nm to 700nm light at total delivered energies of $70J/m^2$ or less will optimally increase sugar yield.

It is accordingly envisioned that light delivery systems may comprise light sources mounted either permanently on poles, in the fields, or preferably on mobile units which could travel through the beet field each night illuminating each portion of the field, along the way, for a period in the order of minutes.

EXAMPLE

In terms of physical arrangement, the field was divided into four strips, each containing a similarly illuminated plot. Within each strip, each illuminated plot was interjacent to a pair of control plots. Also within each strip were a pair of additional control plots more distantly located from the illuminated plot to characterize the geographic variability of the soil.

Within each plot were four subplots, each being subjected to a particular mean light intensity and each comprising three rows of variety A1 and three rows of variety D2. In effect, then each strip comprised a replicate of four illuminated subplots.

The light source comprised a Lumalux lamp and a metal halide arc discharge lamp containing lithium with a peak emission at 670nm. The lamps were filtered by means of amber filters having low optical cutoff at 560nm. Louvres affixed to the lamp fixtures prevented the light from impinging on the control plots. The filtered spectral output from the sources was:

| METAL HALIDE LAMP | | LUMALUX LAMP | |
|---|---|---|---|
| λ | OUTPUT WATTS | λ | OUTPUT WATTS |
| 380 – 540nm | <0.1 | 380 – 540nm | <0.1 |
| 540nm – 560 | 3.9 | 540 – 560 | .7 |
| 560 – 580 | 2.2 | 560 – 570 | 7.1 |
| 580 – 600 | 8.6 | 570 – 580 | 5.4 |
| 600 – 620 | 7.1 | 580 – 590 | 11.0 |
| 620 – 640 | 1.4 | 590 – 600 | 13.3 |
| 640 – 670 | 1.6   35.0 | 600 – 610 | 5.2 |
| 670 – 680 | 18.3 | 610 – 620 | 3.8 |
| 680 – 690 | 4.7 | 620 – 640 | 2.5   15.1 |
| 690 – 700 | 1.9 | 640 – 660 | 1.5 |
| 700 – 720 | 2.1 | 660 – 680 | 1.2 |
| 720 – 740 | 1.4   6.8 | 680 – 700 | 0.9 |
| 740 – 760 | 1.1 | 700 – 720 | 0.6 |
| 760 – 780 | 1.2 | 720 – 740 | 0.5 |
| 780 – 800 | 0.9 | 740 – 760 | .5   4.2 |
| 800 – 950 | 9.0 | 760 – 780 | 2.0 |
| | | 780 – 800 | .6 |
| TOTAL | 65.4W | 800 – 950 | 19.1 |
| | | TOTAL | 75.9 |

The ratio of field illumination from the Lumalux and metal halide lamps varied from 1:1 to 3:1 (Lumalux: metal halide).

An initial comparison of the median weight of sugar recovered from the illuminated beets with the median weight obtained from the controls revealed a 20.7% increase in illuminated A1 and a 13.6% increase in D2.

TABLE I

| | Median Weight of Recoverable Sugar Per Acre | | |
|---|---|---|---|
| | Illuminated | Control | % Increase |
| A1 | 7275 lbs./acre | 6025 lbs./acre | 20.7% |
| D2 | 6800 | 5975 | 13.8% |

The mean increase in recoverable sugar per acre for illuminated plots over control plots in each strip is shown in Table II.

TABLE II

| | | Percent Increases in Recoverable Sugar | | | | |
|---|---|---|---|---|---|---|
| Variety | Strip No: | 1 | 2 | 3 | 4 | Overall Mean |
| A1 | | +22.3% | +2.3% | +16.2% | +28.7% | +17.4% |
| D2 | | +11.2% | −1.4% | +17.1% | +24.4% | +12.8% |

Next, the data was analyzed to determine the effects of light intensity on sugar yield. The horizontal illumination, that is to say the light intercepted by the horizontal plane, was determined for each subplot and is considered the effective parameter owing to the essentially horizontal canopy formed by the beet leaves. As is shown in Table III, somewhat better results were obtained for the lower intensities, and it may be accordingly theorized that the increase in sugar yield will occur with a peak efficiency at a light intensity equal to, or below, $0.47 \mu W/cm^2$. It is additionally apparent, that the maintenance of a precise intensity is not necessary in generating an increase, thereby enhancing the practical aspects of the process.

TABLE III

| Beet Variety | Intensity | % Increase |
|---|---|---|
| A1 | $.47 - 1 \mu W/cm^2$ | 23.2% |
| | $1 - 2 \mu W/cm^2$ | 19.7% |
| | $4 - 6 \mu W/cm^2$ | 11.9% |
| | $8 - 13 \mu W/cm^2$ | 12.3% |
| D2 | $.47 - 1 \mu W/cm^2$ | 23.2% |
| | $1 - 2 \mu W/cm^2$ | 8.1% |
| | $4 - 6 \mu W/cm^2$ | 8.1% |
| | $8 - 13 \mu W/cm^2$ | 11.6% |

It may be appreciated that there are variations in the method set forth which are obvious to one skilled in the art and are within the spirit of the invention as defined in the following claims.

We claim:

1. A method for improving the yield of sugar beets comprising the step of illuminating the beets during at least a portion of the night with low intensity light having predominant spectral components with wavelengths in the range of 560nm to 700nm.
2. The method of claim 1 wherein the beets are illuminated approximately every night.
3. The method of claim 1 wherein the period of illumination is generally centered about solar midnight.
4. The method of claim 3 wherein the beets are illuminated for approximately four hours each night at an intensity in the order of $0.5 \mu W/cm^2$.
5. The method of claim 1 wherein the beets are subjected to sufficient illumination to provide a quantity of optical energy in the order of 70 Joules/m².

* * * * *